Figure 1:
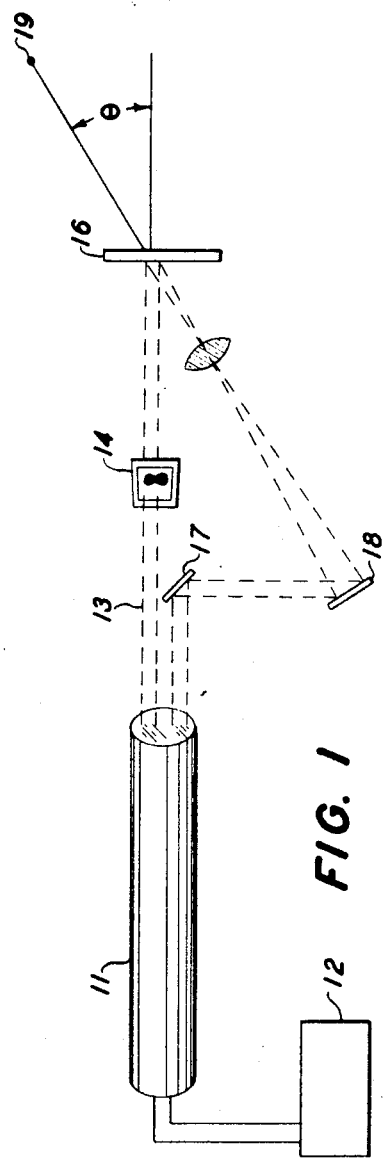

OR   3,655,257

T 3034R

United Sta[tes Patent]
Urbach

[15] 3,655,257
[45] Apr. 11, 1972

[54] APPARATUS FOR FORMING A PHASE HOLOGRAM ON A DEFORMABLE THERMOPLASTIC

[72] Inventor: John C. Urbach, Penfield, N.Y.
[73] Assignee: Xerox Corporation, Rochester, N.Y.
[22] Filed: Oct. 6, 1970
[21] Appl. No.: 78,536

Related U.S. Application Data

[62] Division of Ser. No. 521,982, Jan. 20, 1966, Pat. No. 3,560,205.

[52] U.S. Cl. .................................. 350/3.5, 346/77 E
[51] Int. Cl. .......................................... G02b 27/00
[58] Field of Search .............. 350/3.5, 162 SF; 340/173 TP; 96/1.1; 346/77 E

[56] References Cited

UNITED STATES PATENTS 3,506,327   4/1970   Leith et al. ........................... 350/3.5
3,436,216   4/1969   Urbach ................................. 96/1.1

OTHER PUBLICATIONS

Cathey, Jour. of the Optical Society of America, Vol. 55, April 1965, p. 457

Primary Examiner—David Schonberg
Assistant Examiner—Ronald J. Stern
Attorney—Frank A. Steinhilper, Stanley Z. Cole and James J. Ralabate

[57] ABSTRACT

Method and apparatus for producing holographic interference patterns wherein a modulated coherent object beam and off axis reference beam cooperate to discharge a photoconductive thermoplastic recording member which is then recharged and allowed to deform in accordance with the residual charge pattern thereon. The off axis angle is a function of the quasi-resonant frequency of the thermoplastic.

1 Claims, 4 Drawing Figures

Patented April 11, 1972

3,655,257

INVENTOR.
JOHN C. URBACH
BY
ATTORNEY

APPARATUS FOR FORMING A PHASE HOLOGRAM ON A DEFORMABLE THERMOPLASTIC

This is a division of application Ser. No. 521,982, filed in the United States, Jan. 20, 1966, now U.S. Pat. No. 3,560,205.

This invention relates in general to imaging systems, and, more specifically, to a unique holographic imaging system.

Holography as initially described by Dennis Gabor in an article entitled, "A New Microscopic Principle" appearing in Nature 161, 777-778 (1948) is a two-step imaging process in which the diffraction pattern of an object illuminated with coherent radiation such as light is recorded on a radiation sensitive layer. This record, known as a hologram, is then used to reconstruct an image forming wavefront by reilluminating the hologram with coherent electromagnetic radiation. One of the important problems which existed in holography as originally developed was that reconstruction of the image was imperfect due principally to the fact that the in-focus image had a defocused conjugate or "twin" image as well as non-information carrying light as a background owing to the fact that the phase portion of the original coherent beam was ambiguously recorded. This defect has recently been overcome by a modification of the holographic system known as the off axis reference beam technique described by Leith, E. and Upatnieks, J. in two articles in the *Journal of the Optical Society of America*; "Reconstructed Wave-Fronts in Communication Theory" 52, 1,123 October, 1962 and "Wave-Front Reconstruction with Continuous Tone Objects," 53, 1,377 December, 1963. In this off axis reference beam technique a reference beam of coherent light is brought in at an angle with respect to the beam of coherent light used to expose the image, thus forming an interference pattern on the photosensitive recording plate. After development, this plate or hologram is again exposed to coherent radiation and the image is reconstructed off the optical axis at an angle proportional to the angle of incidence of the original reference beam. The desired reconstructed image is thereby separated from the out of focus twin image as well as from the beams which do not carry useful information. In this technique then, the carrier wave determined by the reference beam has a non-zero mean frequency. The carrier wave is modulated by the object waveform as a result of the amplitude squaring process that takes place during recording of the hologram.

Holography has a great many advantages over other imaging techniques, for example, a hologram may be used to reconstruct a three dimenstional image with radiation of another wavelength than was used to record the hologram, resulting in extremely high magnification. It may be used for the secure transmission of information (since the hologram itself bears little or no resemblance to the original image) and may also be used for rapidly making many images of the original since when the hologram is cut into a number of sections, each section contains all of the holographic information necessary to reconstruct the original image.

Although most experimenters have worked with amplitude holograms, it is also possible to make phase holograms in which the image information is stored in a phase pattern rather than an intensity pattern as described, for example, in an article by G. L. Rogers in the Preceedings of the Royal Society Edinburgh A-63, 193 (1953) and an article by W. T. Cathey Jr., in the *Journal of the Optical Society of America*, 55, 457, (1965). Such phase holograms have previously been made from conventional silver holograms by bleaching the silver using the phase differences introduced by gell swelling and/or refractive index changes. Although these have certain advantages over intensity holograms, they require extremely difficult and complex processing to produce.

Holography also has a number of drawbacks. First of all, the silver halide photographic recording plates used to form the holograms require the use of expensive high resolution material. In addition, the process is a relatively slow two-step affair in which reconstruction cannot be carried out until after the hologram has gone through the conventional silver halide photographic developing steps. Furthermore, no matter how high the resolution of the photographic film employed, the silver halide grains in the emulsion are, by their very nature, discrete particles which scatter light introduced noise into the optical system in intensity holograms. Another problem encountered is that since the photographic film is removed from the optical system during processing, the reconstructed image cannot be viewed as development takes place so as to optimize development of the hologram itself. Furthermore, the holographic recording material is not reusable to make different holograms at a later time.

Accordingly, it is an objective of this invention to provide a novel holographic system devoid of the aforementioned deficiencies.

It is a further object of the invention to provide a novel holographic imaging method.

Still another object of the invention is to provide a novel holographic recording material.

A still further object of the invention is to provide a holographic recording system in which the optical system is "tuned" to the characteristics of the recording material.

Yet another object of the invention is to provide a holographic system with almost instantaneous development which can be achieved without removing the recording material from the optical system.

A still further object of the invention is to provide a holographic system with maximum sensitivity and minimum random noise.

The above and still further objects may be accomplished in accordance with the present invention by recording a phase hologram on a thermoplastic which will spontaneously deform upon softening when it is subjected to an applied electrical charge pattern. This is accomplished by forming a charge pattern on the thermoplastic which corresponds with the optical interference pattern to be recorded as the phase hologram and then softening the thermoplastic until it deforms in conformity with this pattern. Although the off axis reference beam technique is a preferred method for forming the interference pattern to be recorded on the thermoplastic, any suitable optical system capable of yielding the phase hologram construction exposure may be employed. It is also preferred to "tune" the hologram producing set-up so that the holographic carrier wave is at or close to the quasi-resonant spatial frequency of the thermoplastic layer, as this produces an optimum low noise response in the layer. As a consequence of the hydrodyanamic behavior of this thin charged fluid layer, the deformation of the thermoplastic when softened proceeds most rapidly when the electrostatic charge patter on it is at a particular spatial frequency which is here referred to as the quasi-resonant frequency. As explained in greater detail hereinafter, this quasi-resonant frequency is determined mainly by the thickness and to a lesser extent by the applied voltage on the thermoplastic. In addition, recording at or near this quasi-resonant frequency tends to suppress random deformation which constitutes a source of noise in a phase hologram. Tuning of the system may be accomplished by changing the angle of incidence of the off-axis reference beam so that the interfering wave-fronts of the reference beam and the object beam cross at an angle such that the interference fringes have a spatial frequency (reciprocal period) corresponding to the quasi-resonant frequency of the particular thermoplastic being used. On the other hand, the angle of the reference beam in the holographic recording system may be retained at a constant value while the thickness of the thermoplastic is changed to thereby change its quasi-resonant frequency to correspond with the angle between the object and reference beam.

Figure 2:
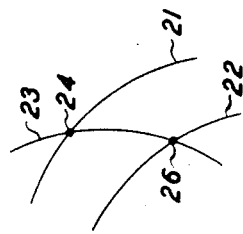
Figures 3, 4:
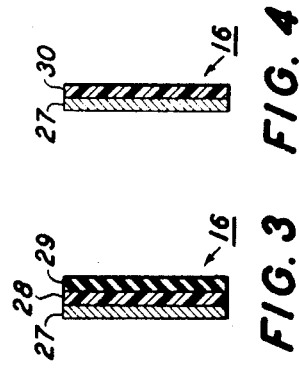

The nature of the invention will be more easily understood when it is considered in conjunction with the accompanying drawings of an exemplary preferred embodiment of the invention wherein:

FIG. 1 is a partially sectioned side view of an off axis reference beam holographic imaging set-up, FIG. 2 is a side sectional view of the intersecting wavefronts from the main beam and the reference beam, FIG. 3 is a side sectional view of one embodiment of a thermoplastic recording beam according to the invention, FIG. 4 is a side sectional view of a second embodiment of a thermoplastic recording medium for use in the invention.

Referring now to FIG. 1 there is seen a Laser 11 coupled to a power source 12. The Laser 11 serves as a source of coherent light for the system, however, it is to be understood that any other source of sufficiently coherent light or other suitable electromagnetic radiation such as a coherent electron beam, X-ray beam, or the like may also be employed. A portion of the coherent light 13 produced by Laser 11 passes through a partially transparent object 14 and impinges on the recording plate generally designated 16. The remaining portion of the light beam 13 is reflected off two mirrors 17 and 18 so that it also strikes the recording plate 16 but at an angle theta with respect to the undeviated beam. Although a transparent object is shown, it is of course to be understood that an opaque object may be employed with the light beam being reflected off it and onto the recording plate so long as the reference beam also strikes the plate at the desired angle theta with respect to the main beam. The processing steps in forming the deformation image on the thermoplastic included in the photographic recording member 16 will, of course, differ with the configuration of the particular recording member as described more fully hereinafter. This procedure may, for example, involve electrostatically charging the recording member, exposing it to the reference beam and the main beam through the object, recharging the thermoplastic recording member and softening it either by subjecting it to mild heating or solvent vapors to cause the deformation pattern to appear on it. A unique feature of the invention is that the reconstructed image may be viewed while the thermoplastic imaging member is being developed. This is accomplished by removing the object 14 from the optical path, blocking the reference beam optical path and viewing the reconstructed image off axis at the angle theta from the main beam such as at point 19. Alternatively, the main beam may be blocked and the former reference beam used for forming the reconstructed image. In this case, the true image will coincide in position with the original object. Thus, the hologram recording plate is reconstructed during development by merely applying heat or solvent vapor to the thermoplastic while viewing it off axis at angle theta.

FIG. 2 is a diagrammatic representation of how the wave-fronts of the main beam and the reference beam cross and interfere with each other with wave-fronts 21 and 22 representing the wave-fronts from the off axis reference beam and 23 representing the wave front from the main beam as modulated by the object. As can be seen by studying FIG. 2, the distance between the two intersection points 24 and 26 can be altered by changing the angle between the reference and the main beams with the distance increasing towards infinity as the angle theta approaches 0. Preferably, the angle is adjusted so that the spacing is at or close to the reciprocal of the quasi-resonant frequency of the thermoplastic within about plus or minus 15 percent of the peak. Generally, this will run about twice the thickness of the thermoplastic material, ranging from about 1.5 to about 2.7 times the thickness for films thicker than about 2 microns and from about 1.5 to about 10 times this thickness for thinner films as described more fully in my copending application entitled "Image Storage" Ser. No. 476,533, filed Aug. 2, 1965.

In FIG. 3, there is shown the cross section of one exemplary embodiment of a suitable recording member for use in the invention. This recording member generally designated 16 may be in the form of a web, a rigid plate, a flexible endless belt or any other suitable mechanical configuration. Although not entirely necessary, the recording member generally designated 16 includes an electrically conductive substrate so as to facilitate charging prior to an imagewise discharge of the recording member upon exposure. Suitable substrates include flexible metal foil or plates made of materials such as aluminum, brass, copper, etc., as well as fairly heat resistant polymers such as polyethylene terephthalate, polycarbonates, polyurethanes and the like coated with thin transparent conductive layers of tin oxide, copper iodide, or the like. With certain charging techniques such as two-sided corona discharge where corona discharge of positive polarity is applied to one side of the recording member while negative polarity corona discharge is applied to the other, the conductive substrate may be eliminated from this system; however, it is generally desirable to incorporate such a substrate to provide mechanical strength in the overall recording member. Over the substrate is a photoconductive insulating layer 28 and a deformable insulating thermoplastic layer 29. The photoconductive layer 28 may consist of any suitable photoconductive insulating material such as amorphous selenium or photoconductive pigments such as cadmium sulfide, cadmium selenide, zinc sulfide, zinc selenide, zinc oxide, lead oxide, lead sulfide, mercuric sulfide, antimony sulfide, mercuric oxide, indium trisulfide, titanium dioxide, arsenic sulfide, gallium triselenide, lead iodide, lead selenide, lead telluride, gallium telluride, mercuric selluride, and the iodide sulfide selenide and tellurides of bismuth, aluminum, and molybdenum dispersed in an insulating film-forming binder such as a silicone resin, a styrene butadiene resin or the like. Other typical photoconductors include the organics especially when these are complexed with small amounts of suitable Lewis Acids. Typical of these organic photoconductors are 1,4-dicyano-naphthalene; anthracene 3-benzylidene amino carbazole, 2,5-bis-(p-aminophenyl-1)-1,3,4-oxidiazole; vinyl carbazole; 2,4-diphenyl-quinazolin; 1-methyl-2-(3',4'-dihydroxymethylene-phenol)-benzimidazole and substituted and unsubstituted phthalocyanines and quinacridones in solutions or dispersed in insulating film forming binders of the type described above. Any suitable deformable insulating thermoplastic layer may be used as layer 29. Typical insulating thermoplastics include the glycerol and pentaerythritol esters of partially hydrogenated rosin; polyalphamethyl styrene, terpolymers of styrene, indene and isoprene; Piccolyte S–70 and S–100 (polyterpene resins made from beta-pinene available from Pennsylvania Industrial Chemical Co. and having ring and ball melting points of 70° and 100° C., respectively); Piccopale 70 SF and Piccopale 85 (non-reactive olefin-diene resins available from Pennsylvania Industrial Chemical Co., having melting points of 70° C. and 85° C. and molecular weights of 800 and 1,000, respectively); Piccodiene 2,212 (a styrene butadiene resin available from the same company; Piccolastic A–75, D–100 and E–100, polystyrene resins with melting points of 75°, 100° and 100° C., respectively, available from the same company); Coumarone Indene Resins available under the tradenames Neville R–21 and Nevillac Hard; Amberol ST–137X (an unreactive, unmodified phenol formaldehyde resin available from the Rohm and Haas Chemical Company of Philadelphia, Pennsylvania; Aroclor 1,242, a chlorinated polyphenyl resin); Pliolite AC (a styrene acrylate copolymer); Pliolite VTAC (a vinyl toluene-acrylate copolymer); Neolyn 23 (an alkyd resin available from Hercules Powder Co.) and mixtures of silicone and styrene resins. In addition, the thermoplastic insulating layer itself may be photoconductive as shown by layer 30 in FIG. 4 and this may be accomplished by taking any suitable photoconductive material and dispersing it, mixing it in solid solution, or copolymerizing it with the resin material to form a single layer upon which the recording is to take place. In another approach, a thermoplastic insulating polymer of this type may be blended with a complexing agent to make it photoconductive by forming a photoconductive charge transfer complex. Thus, for example, phenol formaldehyde polymer may be made photoconductive by complexing it with 2,4,7-trinitrofluorenone or any other suitable Lewis acid. In still a third embodiment of the recording member not shown, electrodes may be provided on both sides of a sandwich made up of a photoconductive insulating layer and a deformable insulating thermoplastic so that the required charge may be applied through the electrodes rather than by corona discharge or some other form of ionizing discharge as the type used with the recording webs of FIGS. 3 and 4.

In imaging the recording web of FIG. 3, the thermoplastic insulating surface 29 of the web is first charged by grounding the conductive backing 27 and passing it under a corona generating electrode connected to a source of high potential adapted to uniformly charge this web. This type of corona charging technique is more fully described in U.S. Pat. Nos. 2,588,699 to Carlson and 2,836,725 to Vyverberg. However, it is to be understood that any other suitable charging method may be used. Once reading member 16 has been uniformly charged, it is placed into the optical system of FIG. 1 and exposed as explained above, in the absence of ambient light. If the recording member of FIG. 3 is then recharged in the dark to a uniform potential, a higher level of charge is built up on exposed areas of the recording web, owing to the movement of charge through the photoconductive layer 28 during exposure in the optical system. This charge is then trapped on opposite sides of the thermoplastic layer 29 so that the recording web may even be handled in the light after the recharging step has been carried out. In fact, after recharging is complete, the recording web may be replaced in the optical system and again exposed to the main beam after the object 14 has been removed so that the hologram will be reconstructed simultaneously with its formation. In other words, one can watch the image form by viewing the reconstruction from point 19. Formation of the hologram may be accomplished by heating the thermoplastic surface which now carries a charge conforming to the image pattern with hot air or radiant heat or any other suitable heat source or by subjecting it to a solvent vapor or some other suitable softening influence. Ripples then appear in the surface of the thermoplastic owing to the effect of the charge pattern on the softened material. This deformation technique is more fully described in the recent literature. See, for example, an article entitled, "A Cyclic Xerographic Method Based on Frost Deformation," by R. W. Gundlach and C. J. Claus, appearing in the January-February 1963 issue of the *Journal of Photographic Science and Engineering*, and U.S. Pat. Nos. 3,113,179; 3,196,011 and 3,196,008. When a recording member of the type shown in FIG. 4 is employed, softening of the photoconductive thermoplastic recording layer 30 is carried out in the dark so that the imagewise charge pattern is not dissipated.

It is, of course, to be understood that an apparatus for carrying out the processing steps described above automatically is contemplated by the invention. This type of apparatus may, for example, be arranged so as to charge, expose, recharge and soften the recording member without moving it from its position in the holographic apparatus. When inspection development is used, a shutter is employed to close off either the direct or the reference beam and the other beam is employed for watching the reconstruction. The charging device is, for example, mounted in the machine so that it can be caused to scan across a surface of the imaging member while the heating device may be arranged to radiate heat towards the imaging member at selected times in the processing cycle.

The holograms of the invention have many advantages, one being that they may be rapidly replicated by mechanical pressing using an intermediate master and is capable of reproducing very fine detail in the replicas. Thus, not only can the holograms themselves be produced very rapidly, but copies of these can also be produced more rapidly than would be possible with convenient silver.

The following illustrative example of a preferred embodiment of the invention is now given to enable those skilled in the art to more clearly understand and practice the invention described above. However, it is to be understood that voltage, angles between the main beam and the reference beam, materials and material thicknesses are interdependent and may vary from system to system as described above while still coming within the scope of the invention and providing highly desirable results.

EXAMPLE

An imaging member is first prepared by applying a coating solution to a NESA glass substrate which is merely a glass base coated with an extremely thin layer of optically transparent tin oxide (available commercially from the Pittsburg Plate Glass Company of Pittsburg, Pennsylvania). This first coating comprises a solution of 20 grams of polyvinylcarbazole and 0.1 grams of brilliant green crystals (C.I. 42042) in 110 grams of dioxane and 110 grams of dichloromethane. It is applied so as to produce a photoconductive layer about 7 microns thick. Over this layer, there is then applied a layer of Staybelite Ester 10 (a glycerol ester of 50 percent hydrogenated rosin available from the Hercules Powder Company) to a dry thickness of about 0.6 micron applied by withdrawing the substrate from a 20 percent solution of the Staybelite in a kerosene solvent at a rate of about 5 inches per minute. After drying, the completed imaging member consisting of a conductive base, a photoconductive layer, and a deformable thermoplastic layer is inserted into an imaging system of the type shown in FIG. 1 and corona charged in darkness to about 500 volts. It is then exposed to the object and reference beams using a helium neon continuous wave laser operating in the Tem 00 mode at 6328 angstrom units (Model 5200 available from the Perkin-Elmer Company) using the same type of exposure setup shown in FIG. 1. The reference beam is brought in at an angle of about 30.4°. After exposure the imaging member is recharged to 500 volts while still remaining in the dark and the hologram is formed by mild heating of the Staybelite. This is accomplished by replacing the imaging member in the holographic setup, removing the object from the optical path and blocking off the reference beam while exposing the imaging member to the main beam and then viewing the imaging member at about 30.4° off axis while applying mild heat to its surface. The reconstructed image is viewed simultaneously with the formation of the hologram. A good quality image with resolution of 800 lines per millimeter is thus produced.

What is claimed is:

1. A holographic imaging apparatus comprising a source of coherent electromagnetic radiation positioned to illuminate an object, a charge deformable thermoplastic imaging member in the optical path of the beam emanating from said radiation source beyond said object, and means to produce a second off axis coherent reference beam of electromagnetic radiation positioned to intersect with said first mentioned beam of coherent radiation at the point in the optical path of said first-mentioned beam where said deformable thermoplastic imaging member is placed, said imaging member further including a photoconductive insulator whereby the interference pattern produced by said two coherent beams is recorded in the form of a pattern of electrostatic charge on said imaging member and means to soften said thermoplastic whereby a deformation pattern corresponding to said charge pattern will form thereon, the angle of intersection between said first mentioned beam of coherent radiation and said reference beam of coherent radiation being adjusted so that the spacing between adjacent carrier interference fringes is within the range of plus or minus 15 per cent of the reciprocal of the peak of the quasi-resonant frequency of said deformable thermoplastic.

* * * * *